(12) United States Patent
Lee

(10) Patent No.: US 9,395,030 B2
(45) Date of Patent: Jul. 19, 2016

(54) STAND AND DISPLAY DEVICE HAVING THE SAME

(71) Applicant: SAMSUNG ELECTRONICS CO., LTD., Suwon-si (KR)

(72) Inventor: You Sub Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 178 days.

(21) Appl. No.: 14/054,014

(22) Filed: Oct. 15, 2013

(65) Prior Publication Data

US 2014/0104763 A1    Apr. 17, 2014

(30) Foreign Application Priority Data

Oct. 15, 2012 (KR) ........................ 10-2012-0114472

(51) Int. Cl.
*G06F 1/16* (2006.01)
*F16M 11/00* (2006.01)
*F16M 11/22* (2006.01)

(52) U.S. Cl.
CPC ............... *F16M 11/00* (2013.01); *F16M 11/22* (2013.01); *F16M 2200/08* (2013.01); *G06F 1/16* (2013.01)

(58) Field of Classification Search
CPC ... G06F 1/1601; G06F 1/1616; G06F 1/1626; G06F 1/1637; G06F 1/1656; G06F 1/203; G06F 2200/1637; G06F 19/3418; G06F 19/3431; G06F 19/345; G06F 19/3462; G06F 1/1632; G06F 1/1643; G06F 1/1647; G06F 1/1671; G06F 1/1683; G06F 1/1684; G06F 1/1686; G06F 1/1694; G06F 1/181; G06F 2200/1612; G06F 2200/1636; G06F 3/01; H05K 5/0017; H05K 5/0204; H05K 13/0023; H05K 1/141; H05K 1/148; H05K 2201/10477; H05K 3/0061; H05K 5/02; H05K 5/0217; H05K 7/00; H05K 7/16; H05K 7/20127; H05K 7/20972; H05K 7/02; H05K 7/20963; H05K 1/147; H05K 1/189; H01R 29/00; H01R 43/26; H01R 43/24; F16M 2200/08; F16M 11/00; F16M 11/22; F16M 11/04; F16M 11/10; F16M 11/14; F16M 11/2014; F16M 11/2078; F16M 11/40; F16M 2200/022; F16M 2200/044; F16M 2200/065
USPC ............. 361/679.01, 679.02, 679.21, 679.26, 361/679.27, 679.22; 248/917–924
See application file for complete search history.

(56) References Cited

U.S. PATENT DOCUMENTS 1,955,773 A * 4/1934 Roth ............................ 211/172
2,893,674 A    7/1959 Monaco
(Continued)

FOREIGN PATENT DOCUMENTS

| CN | 202392375 U | 8/2012 |
| DE | 92 13 300 U1 | 3/1993 |
| JP | 53-77254 U | 7/1978 |
| WO | 2009/135366 A1 | 11/2009 |

OTHER PUBLICATIONS

Communication issued on Jan. 30, 2015 by the European Patent Office in related application No. 13188543.6.
(Continued)

*Primary Examiner* — Anthony Haughton
*Assistant Examiner* — Ingrid Wright
(74) *Attorney, Agent, or Firm* — Sughrue Mion, PLLC

(57) ABSTRACT

A stand and a display device having the same are provided. The display device including a display module; and a stand configured to support the display module, wherein the stand includes: a pair of brackets, each of the brackets having a ring shaped cross section to support the display module and end portions that are compressed; a neck including an upper portion coupled to the display module and a lower portion to which center portions of the brackets are fixed while in a state of being connected to each other while crossing each other in an X-shape; and a mold configured to form an external appearance of the stand while surrounding the brackets and the neck.

16 Claims, 9 Drawing Sheets

(56) References Cited

U.S. PATENT DOCUMENTS 3,559,942 A    2/1971  Lucasey
5,787,621 A *  8/1998  Leksell ............... G09F 15/0025
                                                    40/606.12
7,869,202 B2 * 1/2011  Chiang et al. ............ 361/679.22

OTHER PUBLICATIONS

Communication dated Feb. 4, 2014 issued by the European Patent Office in counterpart European Patent Application No. 13188543.6.

* cited by examiner

STAND AND DISPLAY DEVICE HAVING THE SAME

CROSS-REFERENCE TO RELATED APPLICATION

This application claims priority from Korean Patent Application No. 2012-0114472, filed on Oct. 15, 2012 in the Korean Intellectual Property Office, the disclosure of which is incorporated herein by reference, in its entirety.

BACKGROUND

1. Field

Apparatuses consistent with exemplary embodiments relate to a stand and a display device having the same.

2. Description of the Related Art

A display device, such as a television and a computer monitor, displays an image on a screen.

In recent years, flat panel display devices have replaced cathode-ray tube display devices to provide thickness reduction, weight reduction and low power consumption.

Flat panel display devices are primarily divided into light emitting types and light receiving types. The light emitting type flat panel display may include a plasma display panel (PDP) and an organic light emitting diode (OLED), and the light receiving type flat panel display may include a liquid crystal display (LCD).

The display device may be supported by a stand which includes brackets to support a display module, a neck to connect the brackets to the display module, and a mold to form an external appearance of the stand while surrounding the brackets and the neck.

The bracket in general use has a 'ㄷ' shaped cross section, producing a small modulus of cross section. However, in order to provide sufficient rigidity for a product, the bracket needs to have a large cross section, causing the size of the bracket to be increased, which degrades the esthetic appearance.

In addition, the brackets are fixed to the neck while in a state of being disconnected from each other, resulting in a gap being formed between the brackets, thereby resulting in difficulty in resisting a shaking of the display device in front and rear side directions.

SUMMARY

One or more exemplary embodiments provide a stand having an improved appearance thereof by achieving slimness of a bracket, which forms the stand, and a display device having the same.

One or more exemplary embodiments also provide a stand having improved rigidity thereof by fixing brackets to a neck while in a state of the brackets connected to each other while crossing each other, and a display device having the same.

In accordance with an aspect of an exemplary embodiment, there is provided a display device including a display module and a stand to support the display module. The stand may include one pair of brackets, a neck and a mold. The one pair of brackets may each be provided using a pipe having a ring shaped cross section to support the display module, wherein each of the brackets has end portions compressed to a slim thickness. The neck may have an upper portion coupled to the display module and a lower portion to which center portions of the one pair of brackets are fixed in a state of being connected to each other while crossing each other in an X-shape.

The mold may be configured to form an external appearance of the stand while surrounding the one pair of brackets and the neck.

The display module may include a display panel, a bottom sash disposed at a rear side of the display panel to accommodate the display panel, a side cover to form a lateral side appearance while being disposed at a rear side of the bottom sash in order to accommodate a periphery of the bottom sash, and a rear cover to form a rear side appearance while being disposed at a rear side of the bottom sash.

The rear cover may be provided at a lower portion of a rear surface thereof with a coupling portion to which the neck is coupled.

The one pair of brackets may include intersection portions that are respectively provided at center portions thereof so as to make contact with each other with one on top of another while crossing each other, cylindrical portions connected to both end portions of each of the intersection portions while having ring shaped cross sections, and compression portions provided at an end portion of each of the cylindrical portions in a compressed form and slim of thickness.

Each of the cylindrical portions may be formed with a first coupling hole adjacent to the intersection portion, and the neck may be provided at the lower portion thereof with a second coupling hole at a position which corresponds to the first coupling hole, so that the one pair of brackets are coupled to the neck through a fastening member that passes through the first coupling hole and the second coupling hole.

The neck may be provided at the upper portion thereof with a third coupling hole that allows the neck to be coupled to the coupling portion provided on the rear cover.

The compression portion may be compressed to a diameter that is decreased as it becomes further from the cylindrical portion.

In accordance with an aspect of another exemplary embodiment, there is provided a stand coupled to a display module in order to support the display module, the stand including a neck, one pair of brackets and a mold. The neck may be coupled to a coupling portion that is provided on the display module. The one pair of brackets may be fixed to a lower portion of the neck to support the display module and may be provided using a pipe having a ring shaped cross section. The mold may be configured to form an external appearance of the stand while surrounding the one pair of brackets and the neck. The one pair of brackets may be fixed to the neck while in a state of being connected to each other while crossing each other in an X-shape, and both end portions of the one pair of brackets are compressed to a slim thickness.

The one pair of brackets may respectively include intersection portions provided at center portions thereof, so as to make contact with each other with one on top of another while crossing each other, cylindrical portions connected to both end portions of each of the intersection portions while having ring shaped cross sections, and compression portions provided at an end portion of each of the cylindrical portions in a compressed form and having a slim thickness.

Each of the cylindrical portions may be formed with a first coupling hole adjacent to the intersection portion, and the neck may be provided at the lower portion thereof with a second coupling hole at a position which corresponds to the first coupling hole, so that the one pair of brackets are coupled to the neck through a fastening member that passes through the first coupling hole and the second coupling hole.

The neck may be provided at the upper portion thereof with a third coupling hole that allows the neck to be coupled to the coupling portion provided on the rear cover.

The compression portion may be compressed to have a diameter that decreases as it extends from the cylindrical portion.

In accordance with an aspect of another exemplary embodiment, there is provided a stand coupled to a display module to support the display module, the stand including a neck, one pair of brackets and a mold. The neck may be provided at an upper portion and lower portion thereof with a plurality of coupling holes. The neck being coupled to the display module through the coupling hole provided at the upper portion thereof. The one pair of brackets may be configured to support the display module while being fixed to the lower portion of the neck through the coupling hole provided at the lower portion of the neck, and the one pair of brackets may have both end portions thereof compressed to a slim thickness. The mold may be configured to form an external appearance of the stand while surrounding the one pair of brackets and the neck. The one pair of brackets may cross each other to have center portions thereof connected to each other so as to be fixed to the neck in an X-shape.

The one pair of brackets may respectively include intersection portions provided at center portions thereof so as to make contact with each other with one on top of another while crossing each other, cylindrical portions connected to both end portions of each of the intersection portions while having ring shaped cross sections, and compression portions provided at an end portion of each of the cylindrical portions in a compressed form having a slim thickness.

The plurality of coupling holes provided in the neck may include a second coupling hole provided on the lower portion of the neck, and a third coupling hole provided at the upper portion of the neck, and the one pair of brackets may be provided with a first coupling hole at a position which corresponds to the second coupling hole.

BRIEF DESCRIPTION OF THE DRAWINGS

The above and/or other aspects will become apparent and more readily appreciated from the following description of the exemplary embodiments, taken in conjunction with the accompanying drawings of which.

DETAILED DESCRIPTION OF THE EXEMPLARY EMBODIMENTS

Figure 1:
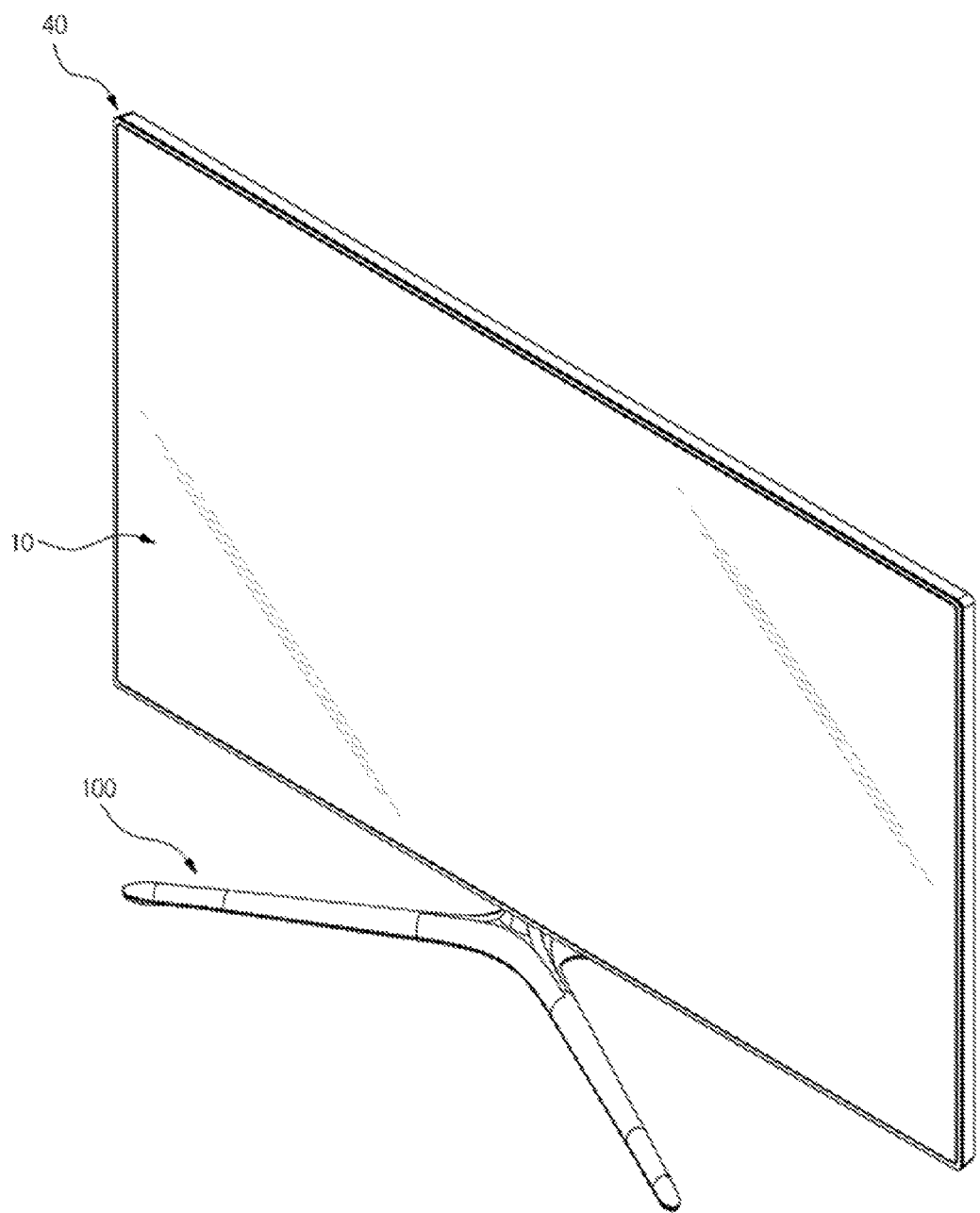
FIG. 1 is a perspective view illustrating a display device in accordance with an exemplary embodiment.

Reference will now be made in detail to the exemplary embodiments, examples of which are illustrated in the accompanying drawings, wherein like reference numerals refer to like elements throughout.

Figure 2:
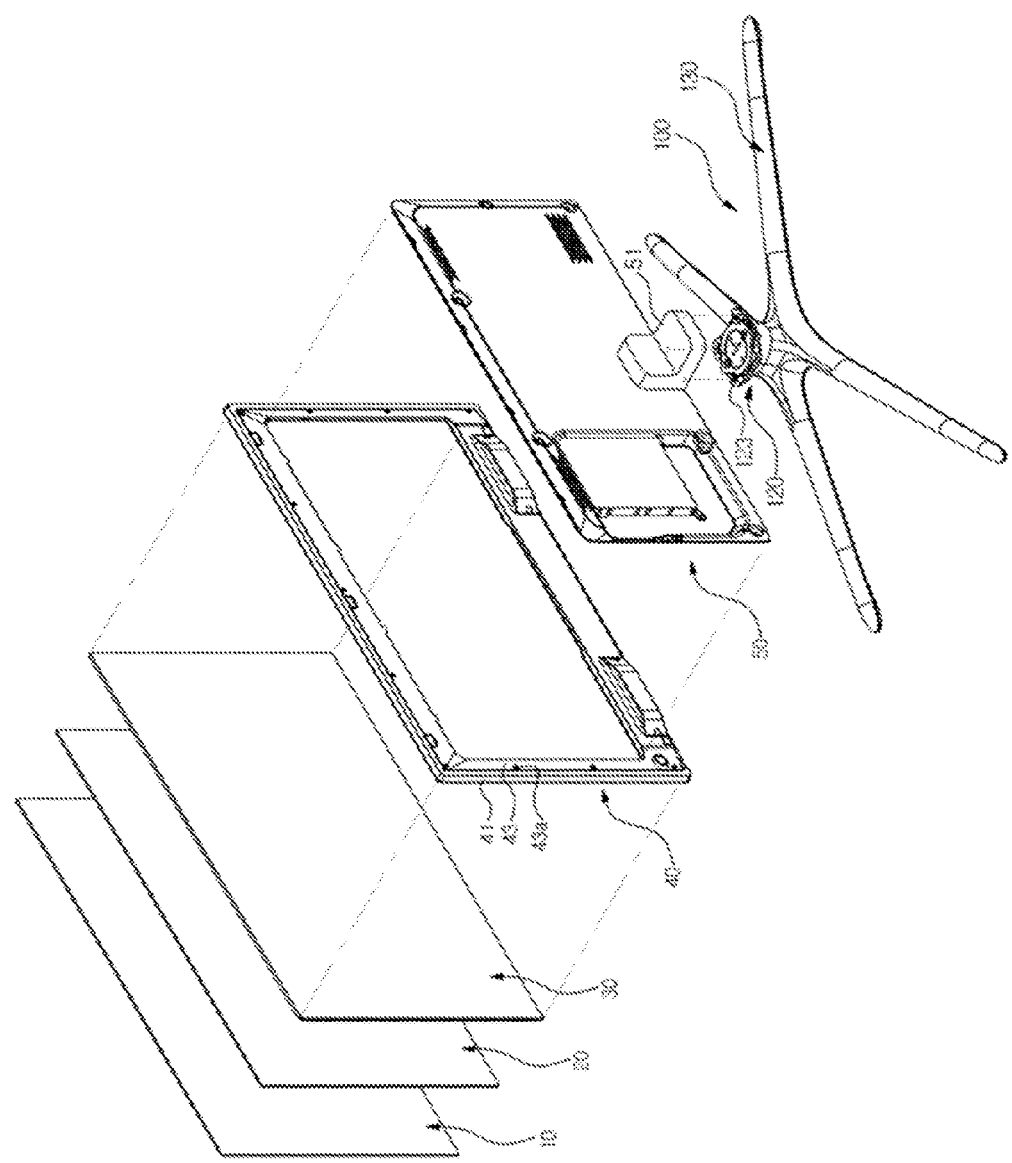
FIG. 2 is an exploded perspective view which illustrates the display device in accordance with an exemplary embodiment.
Figure 3:
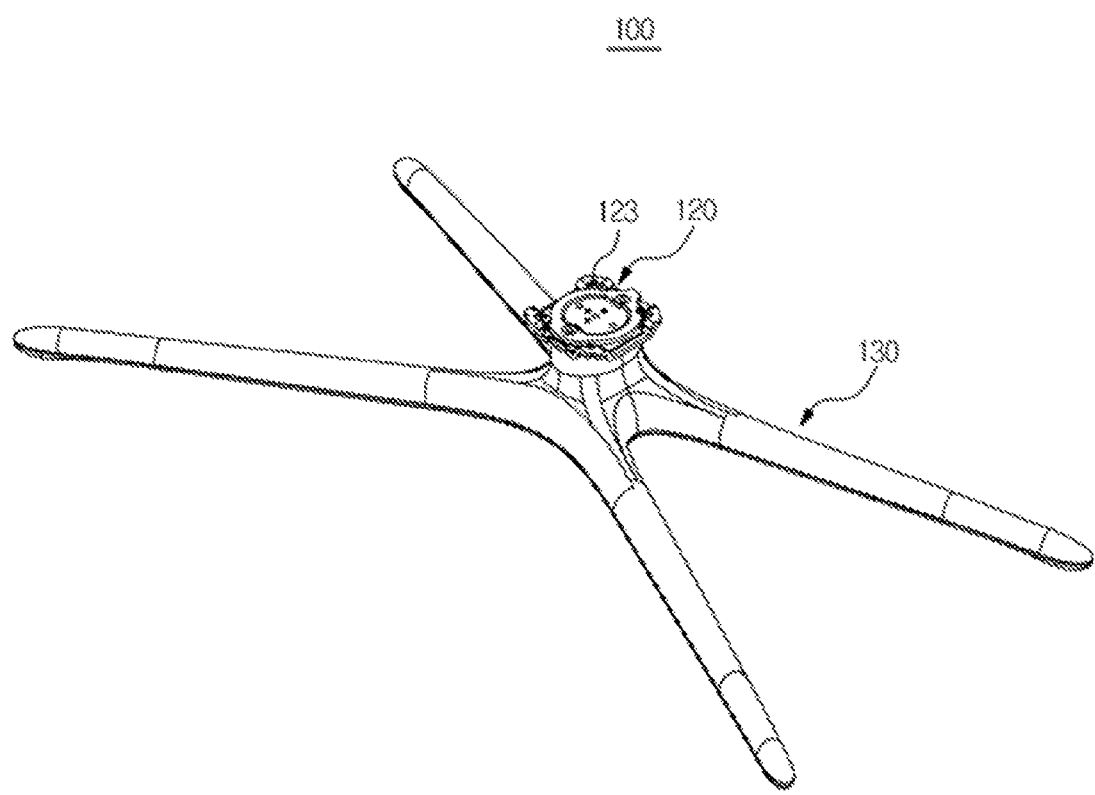
FIG. 3 is a perspective view which illustrates a stand in accordance with an exemplary embodiment.
Figure 4:
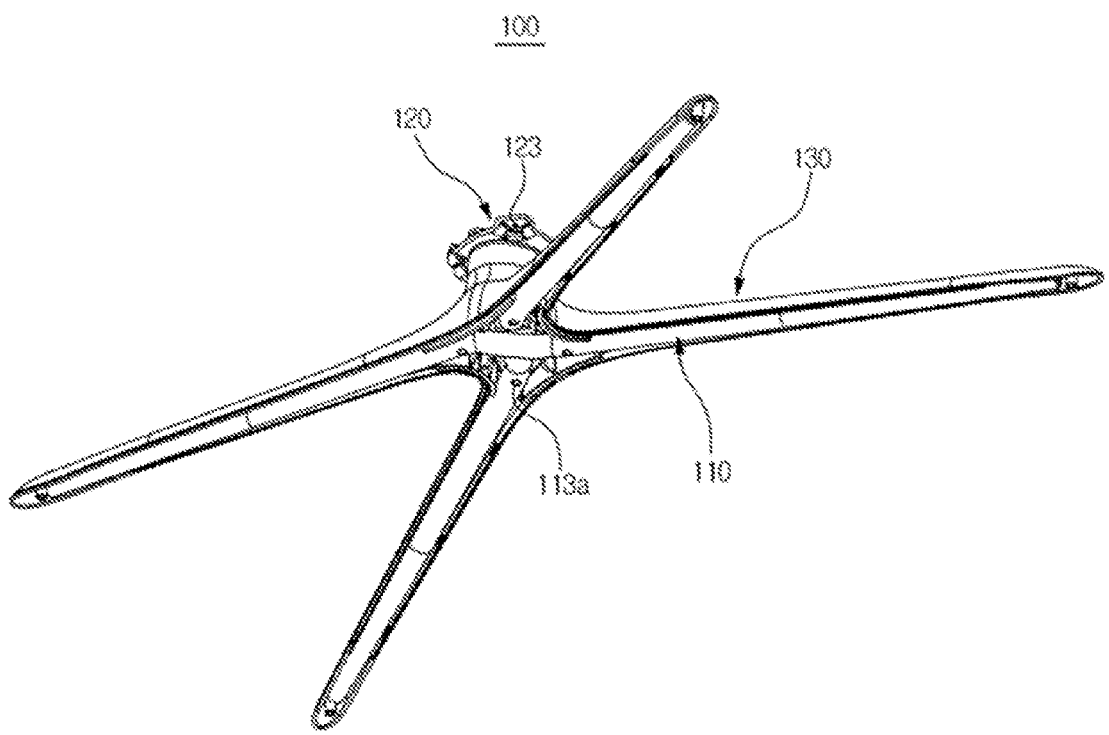
FIG. 4 is a perspective view which illustrates a lower portion of the stand in accordance with an exemplary embodiment.
Figure 5:
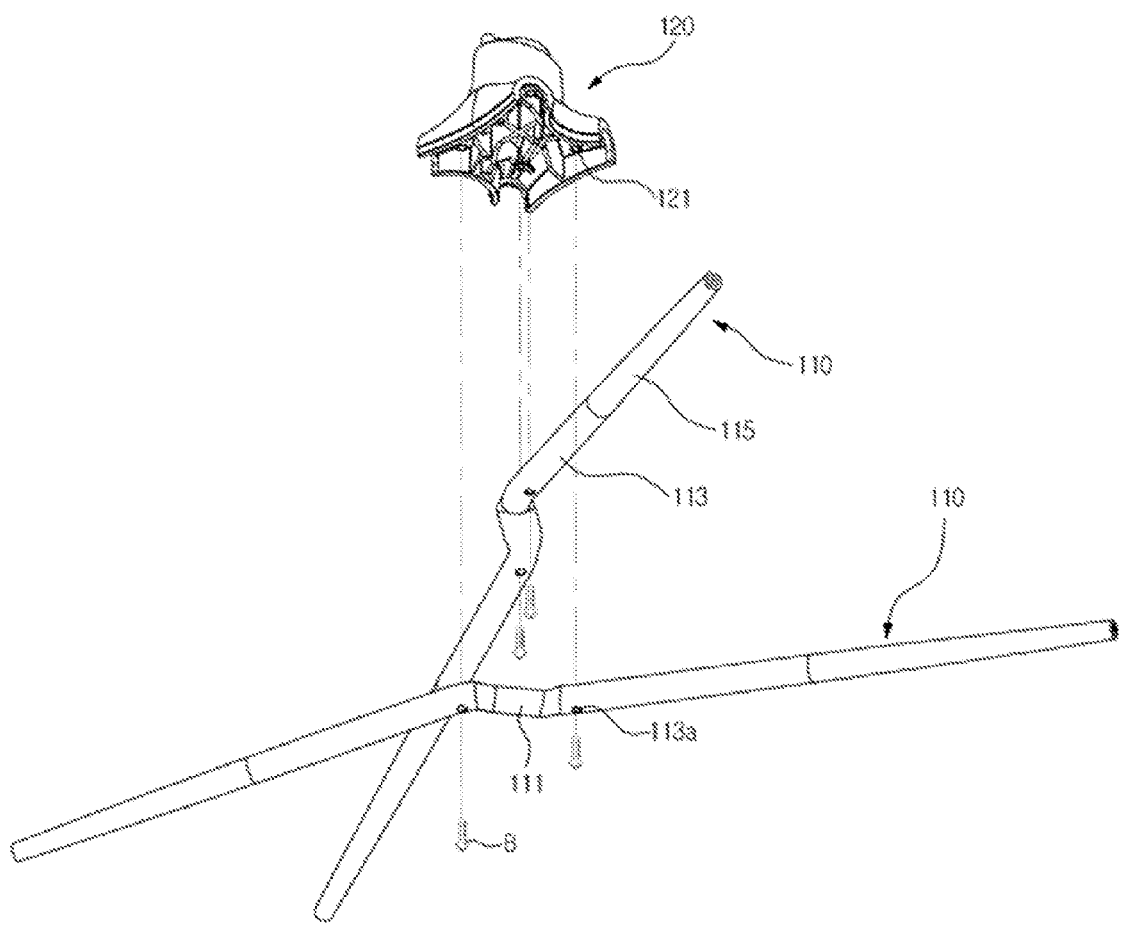
FIG. 5 is a drawing which illustrates one pair of brackets being coupled to a neck in accordance with an exemplary embodiment.
Figure 6:
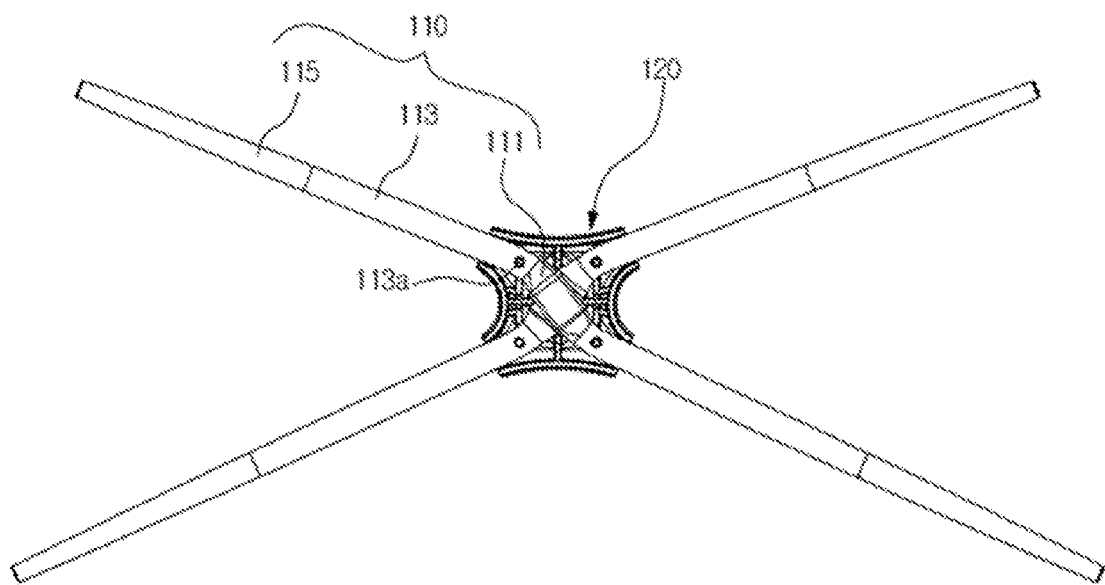
FIG. 6 is a drawing which illustrates a state of one pair of brackets coupled to a neck in accordance with an exemplary embodiment.
Figure 7:
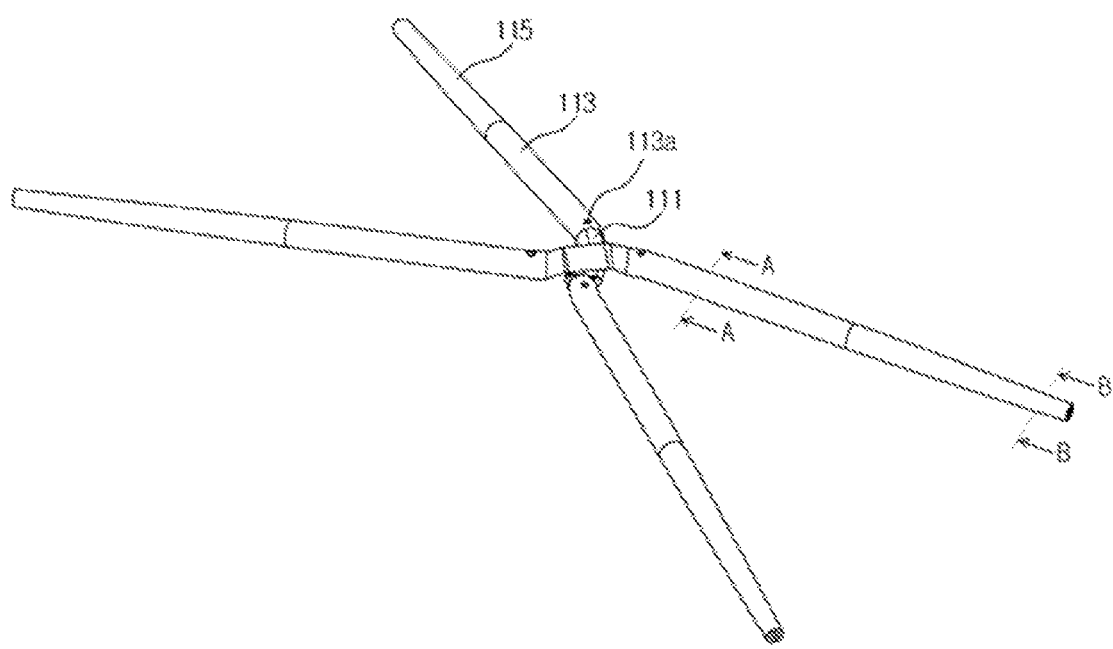
FIG. 7 is a drawing which illustrates the one pair of brackets in accordance with an exemplary embodiment.
Figure 8:
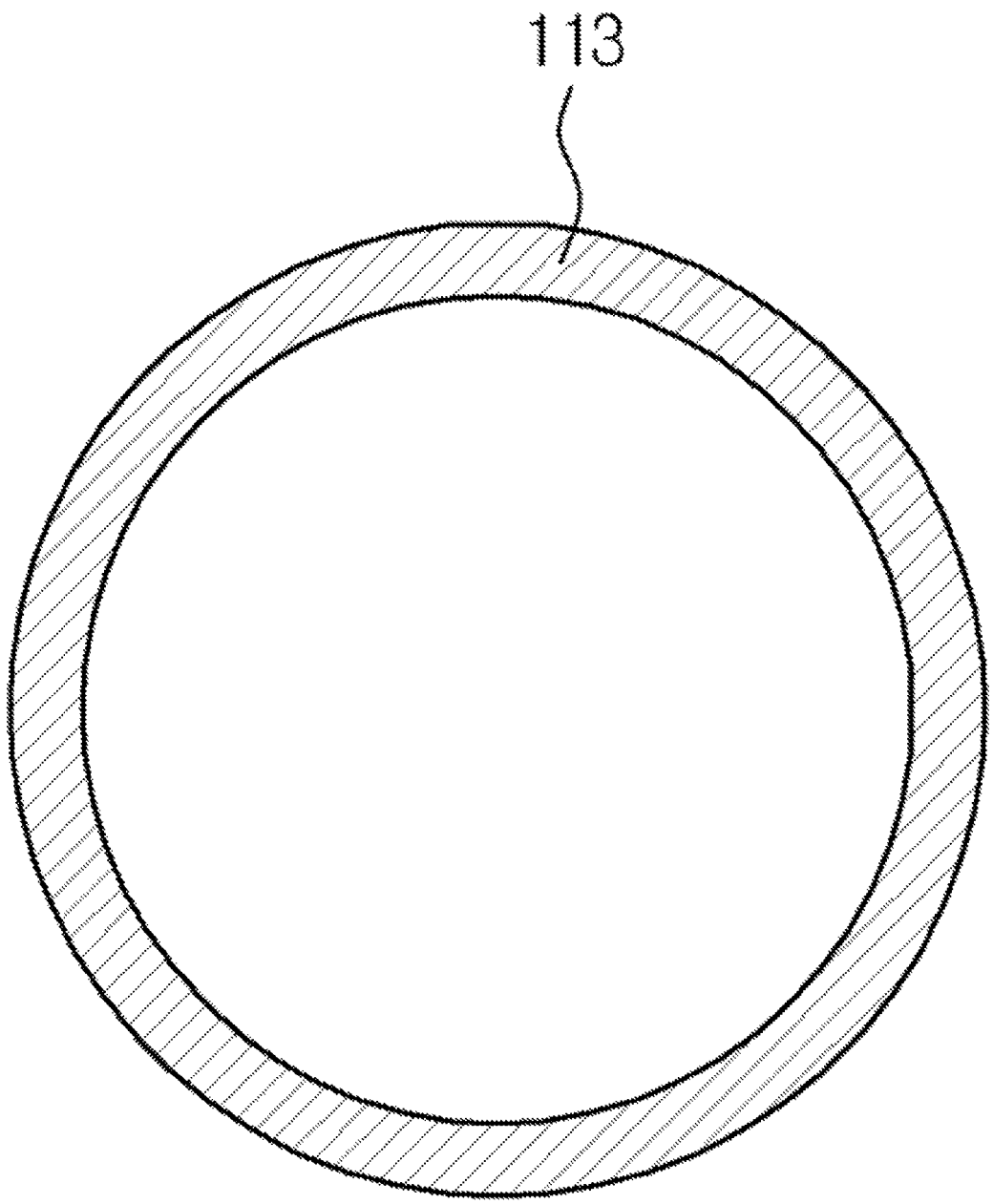
FIG. 8 is a cross sectional view taken along line A-A of FIG. 7.

Referring to FIGS. 1 and 2, the display device includes a display module and a stand 100 supporting the display module. The display module includes a display panel 10 on which an image is displayed, a display unit 20 to form an image, a bottom sash 30 disposed at a rear side of the display unit 20 to accommodate the display panel 10 and the display unit 20, a side cover 40 which forms a lateral side appearance of the display device while being disposed at a rear side of the bottom sash 30 to accommodate a periphery of the bottom sash 30, and a rear cover 50 to form a rear side appearance of the display device while being disposed at a rear side of the bottom sash 30.

The display panel 10 is accommodated in the bottom sash 30 while having a front surface thereof exposed to the outside except for the periphery thereof.

The display unit 20 is disposed at a rear side of the display panel 10 in order to form an image while using a flat panel display device and may be implemented as any one of various types, for example, a liquid crystal display (LCD), a plasma display panel (PDP) or an organic electro luminescence display (EL).

In the case of the display unit 20 being an LCD, the display unit 20 may include a light source (not shown) to generate light, a light guide panel (not shown) to forwardly guide light generated from the light source, optical sheets (not shown) including a liquid crystal layer, and a glass (not shown) formed of transparent material allowing light to pass therethrough.

The bottom sash 30 is disposed at a rear side of the display unit 20 in order to accommodate the display panel 10 and the display unit 20.

The side cover 40 forms a lateral side appearance of the display device while being disposed at a rear side of the bottom sash 30 to accommodate the periphery of the bottom sash 30 in which the display panel 10 and the display unit 20 are accommodated.

The side cover 40 includes a periphery portion 41 that is disposed at an outer part of the bottom sash 30 to prevent the periphery of the bottom sash 30 from being disposed to the outside, and a support portion 43 that extends from the periphery portion 41 to support the bottom sash 30.

The periphery portion 41 forms the lateral side appearance of the display device, and includes a front portion that covers an outer part of the lateral side of the bottom sash 30, in which the display panel 10 is accommodated, to prevent the lateral side of the bottom sash 30 from being exposed to the outside, and a rear portion that covers an outer part of the lateral side of the rear cover 50 to prevent the lateral side of the rear cover 50 from being exposed to the outside.

The support portion 43 extends from the periphery portion 41 so as to support the bottom sash 30 while being coupled to the bottom sash 30.

The support portion 43 is provided with a plurality of fastening holes 43a for coupling to the bottom sash 30, and although not shown in the drawings, the bottom sash 30 is provided with a plurality of holes at positions which correspond to the fastening holes 43a of the support portion 43 such that the side cover 40 is coupled to the bottom sash 30 through screws (not shown).

The rear cover 50 is disposed at a rear side of the bottom sash 30 to form a rear side appearance of the display device, and is provided with a coupling portion 51 to which a stand 100 supporting the display module is coupled at a lower portion of a rear side thereof.

Referring to FIGS. 3 to 6, the stand 100 includes one pair of brackets 110 to support the display module, a neck 120 to fix the one pair of brackets while being coupled to the display module, and a mold 130 which forms an external appearance of the stand 100 while surrounding the one pair of brackets 110 and the neck 120.

The bracket 110 which supports the display module is provided in one pair of pipes each having a ring shaped cross section.

The one pair of brackets 110 is implemented using a general pipe that is known in the related art. Since an additional processing is performed only on center portions of the brackets 110, which are provided to allow the brackets 110 to be fixed to the neck 120, and end portions of the brackets 110, which are compressed to have a slim structure and maximum rigidity, the manufacture process is achieved at a relatively inexpensive cost per unit.

The brackets 11 include intersection portions 111 that are respectively provided at center portions thereof, so as to make contact with each other with one on top of another while crossing each other when the brackets 110 are fixed to the neck 120, cylindrical portions 113 connected to both end portions of each of the intersection portions 111 while having ring shaped cross sections, and compression portions 115 provided at an end portion of each of the cylindrical portions 113 in a compressed form having a slim thickness.

The cylindrical portions 113 refer to portions provided in the form of a pipe having a ring shaped cross section, and are provided with a plurality of first coupling holes 113a to fix the brackets 110 to the neck 120 at portions adjacent to the intersection portions 111.

Two first coupling holes 113a are provided in each bracket 110, resulting in a total of four first coupling holes 113a in the one pair of brackets 110. The neck 120 having the one pair of brackets 110 fixed thereto is provided at a lower portion thereof with second coupling holes 121 at a position which corresponds to the first coupling holes 113a, so that the one pair of brackets 110 are coupled to the neck 120 by fastening members B that pass through the first coupling holes 113a and the second coupling holes 121.

The drawings illustrate a plurality of first coupling holes 113a are provided in the cylindrical portion 113, but the present disclosure is not limited thereto. For example, a plurality of first coupling holes may be formed at an outer part of a region of the intersection portions 111 at which the brackets 110 cross each other.

The intersection portions 111 disposed between the cylindrical portions 113 at the center of the brackets 110 are compressed to have a flat shape such that a slim thickness is achieved even when the one pair of brackets 110 cross each other.

Figure 9:
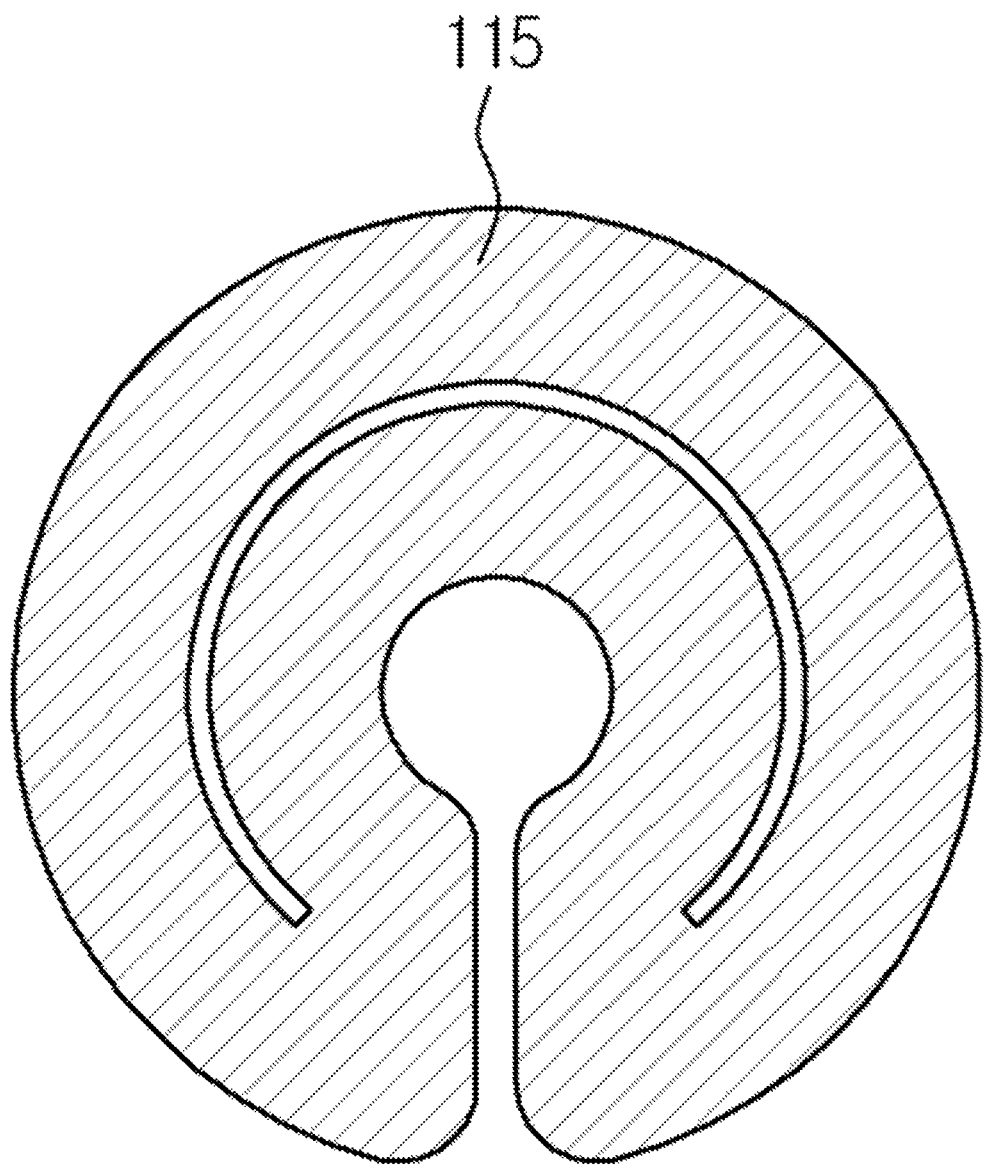
FIG. 9 is a cross sectional view taken along line B-B of FIG. 7.

Referring to FIG. 9, the compressor portion 115 refers to an end portion of the cylindrical portion 113 compressed to a slim thickness. By having a minimum cross section, the compression part 115 is slimmer than the cylinder portion 113 while having sufficient rigidity.

The compression portion 115 is compressed so as to have a diameter that decreases as it becomes more distant from cylindrical portion 113, providing sufficient rigidity. In addition, the mold 130 surrounding the bracket 110 is provided in a shape which corresponds to the compression portion 115, providing a superior aesthetic appearance.

The one pair of brackets 110 supports the display module while being fixed to the neck 120. The brackets 110 are fixed to the neck 120 while having the intersection portions 111 crossing each other in an X-shape such that the one pair of brackets 110 are fixed to the neck 120 while in a state of being connected to each other.

Since the one pair of brackets 110 are fixed to the neck 120 while in a state of being connected to each other, the rigidity of the stand 100 is increased while preventing the display module from being shaken in the forward and backward directions.

The neck 120 has an upper portion thereof coupled to the display module, and a lower portion thereof to which the one pair of brackets 110 are fixed, thereby allowing the one pair of brackets 110 to support the display module.

A third coupling hole 123 is provided at the upper portion of the neck 120, and the neck 120 is coupled to the coupling portion 51, which is provided at the rear cover 50, through the third coupling hole 123.

The neck 120 is provided at the lower portion thereof with the second coupling hole 121 as described above, in order to fix the one pair of brackets 110 to the neck 120. The one pair of brackets 110 are fixed to the lower portion of the neck 120 by the fastening members B that pass through the second coupling hole 121 and the first coupling hole 113a provided in the one pair of brackets 110.

As described above, the one pair of brackets 110 cross each other in an X-shape at the lower portion of the neck 120, and a description thereof will be omitted.

The mold 130 is provided to surround the outside of the one pair of brackets 110 and the neck 120 to form the external appearance of the stand 110.

The mold 130 refers to a portion of the stand that forms the external appearance of the stand 100. A part of the mold 130, which surrounds the one pair of brackets 110, serves as legs of the stand 100 at a lower portion which is provided in a shape that corresponds to the one pair of brackets 110.

Since the one pair of brackets 110 is provided to have a slim thickness while maintaining rigidity, the mold 130 surrounding the one pair of brackets 110 has an external appearance of superior esthetic quality.

As is apparent from the above, according to the exemplary embodiments, the achieved stand has a slim thickness and an esthetic appearance is provided. In addition, sufficient rigidity is maintained even with a slim thickness.

Although a few exemplary embodiments have been shown and described, it would be appreciated by those skilled in the art that changes may be made in these exemplary embodiments without departing from the principles and spirit of the disclosure, the scope of which is defined in the claims and their equivalents.

What is claimed is:
1. A display device comprising:
a display module; and
a stand configured to support the display module,
wherein the stand comprises:
a pair of brackets, each of the brackets comprises an intersection portion provided at a center portion thereof, cylindrical portions that are connected to both end portions of the intersection portion and have ring shaped cross section to support the display module, and compression portions that are provided at end portions of the cylindrical portions and are compressed to have a diameter that decreases as it becomes more distant from the cylindrical portions;
a neck including an upper portion coupled to the display module and a lower portion to which the center portion of each of the brackets is fixed, the brackets connected to each other while crossing each other in an X-shape; and a mold configured to form an external appearance of the stand while surrounding the brackets and the neck.

2. The display device of claim 1, wherein the display module comprises: a display panel;
   a bottom sash disposed at a rear side of the display panel to accommodate the display panel;
   a side cover configured to form a lateral side appearance while being disposed at a rear side of the bottom sash to accommodate a periphery of the bottom sash; and
   a rear cover configured to form a rear side appearance while being disposed at a rear side of the bottom sash.

3. The display device of claim 2, wherein the rear cover includes a coupling portion to which the neck is coupled and which is provided at a lower portion of a rear surface of the rear cover.

4. The display device of claim 1, wherein the intersection portion of one bracket contacts the intersection portion of the other bracket.

5. The display device of claim 4, wherein each of the cylindrical portions includes a first coupling hole adjacent to the intersection portion, and the neck includes a second coupling hole at a position which corresponds to the first coupling hole, so that the pair of brackets are coupled to the neck through a fastening member that passes through the first coupling hole and the second coupling hole.

6. The display device of claim 5, wherein the neck includes a third coupling hole that is provided at the upper portion thereof and through which the neck is coupled to the coupling portion provided on the rear cover.

7. A stand coupled to a display module to support the display module, the stand comprising:
   a neck coupled to a coupling portion that is provided on the display module;
   a pair of brackets which are fixed to a lower portion of the neck to support the display module, each of the brackets comprises an intersection portion provided at a center thereof, cylindrical portions that are connected to both end portions of the intersection portion and have ring shaped cross section, and compression portions that are provided at end portions of the cylindrical portions and are compressed to have a diameter that decreases as it becomes more distant from the cylindrical portions; and
   a mold that is configured to form an external appearance of the stand and surrounds the brackets and the neck,
   wherein the brackets are connected to each other while crossing each other in an X-shape, each of the brackets is fixed to the neck.

8. The stand of claim 7, wherein the intersection portion of one bracket makes contact with the intersection portion of the other bracket.

9. The stand of claim 8, wherein each of the cylindrical portions includes a first coupling hole adjacent to the intersection portion and the neck includes with a second coupling hole provided at the lower portion thereof at a position which corresponds to the first coupling hole, so that the brackets are coupled to the neck through a fastening member that passes through the first coupling hole and the second coupling hole.

10. The stand of claim 9, wherein the neck includes a third coupling hole that is provided at the upper portion thereof and allows the neck to be coupled to the coupling portion provided on a rear cover.

11. A stand coupled to a display module to support the display module, the stand comprising:
    a neck including a plurality of coupling holes provided at an upper portion and lower portion thereof, the neck coupled to the display module through the coupling hole provided at the upper portion thereof;
    a pair of brackets configured to support the display module while being fixed to the lower portion of the neck through the coupling hole provided at the lower portion of the neck, each of the brackets comprises an intersection portion provided at center thereof, cylindrical portions that are connected to both end portions of the intersection portion and have ring shaped cross sections, and compression portions that are provided at end portions of the cylindrical portions and are compressed to have a diameter that is decreases as it becomes more distant from the cylindrical portions; and
    a mold configured to form an external appearance of the stand while surrounding the brackets and the neck,
    wherein the brackets connected to each other while crossing each other in an X-shape, each of the brackets is fixed to the neck.

12. The stand of claim 11, wherein the intersection portion of one bracket makes contact with the intersection portion of the other bracket.

13. The stand of claim 12, wherein the plurality of coupling holes provided in the neck include a second coupling hole provided on the lower portion of the neck, and a third coupling hole provided at the upper portion of the neck, and the brackets are provided with a first coupling hole at a position which corresponds to the second coupling hole.

14. A display device comprising:
    a display module; and
    a stand to support the display module,
    wherein the stand comprises:
    a pair of brackets, each of the brackets comprises a center portion, cylindrical portions that are connected to ends of the center portion and have a ring shaped cross section, and compression portions that are provided at end portions of the cylindrical portions and are compressed to have a diameter that decreases as it becomes more distant from the cylindrical portions; and
    a neck having an upper portion coupled to the display module and a lower portion to which each of the brackets is fixed, the brackets connected to each other while crossing each other in an X-shape.

15. The display device of claim 14, wherein the center portion of one bracket makes contact with the center portion of another bracket.

16. The display device of claim 14, further comprising a mold configured to form an external appearance of the stand while surrounding the brackets and the neck.

* * * * *